United States Patent [19]
Shyu

[11] Patent Number: 5,691,746
[45] Date of Patent: Nov. 25, 1997

[54] DIGITAL VIDEO FORMAT CONVERSION BY UPSAMPLING DECOMPRESSED DATA USING ON-THE-FLY INTERPOLATION AND COLOR CONVERSION

[75] Inventor: Rong-Fuh Shyu, Taiwan, Taiwan

[73] Assignee: Winbond Electronics Corp., Hsin-Chu, Taiwan

[21] Appl. No.: 688,725

[22] Filed: Jul. 31, 1996

Related U.S. Application Data

[63] Continuation of Ser. No. 330,464, Oct. 28, 1994, abandoned.

[51] Int. Cl.$^6$ .................................................. G09G 5/02
[52] U.S. Cl. ........................... 345/150; 345/154; 348/488
[58] Field of Search ........................... 345/150, 132, 345/138, 154; 348/458, 488

[56] References Cited

U.S. PATENT DOCUMENTS

| | | | |
|---|---|---|---|
| 4,751,742 | 6/1988 | Meeker | 382/240 |
| 4,752,826 | 6/1988 | Barnett | 345/138 |
| 4,808,988 | 2/1989 | Burke et al. | 345/133 |
| 5,119,082 | 6/1992 | Lumelsky et al. | 345/132 |
| 5,182,645 | 1/1993 | Breeuwer et al. | 348/458 |
| 5,280,343 | 1/1994 | Sullivan | 348/488 |
| 5,341,442 | 8/1994 | Barrett | 382/166 |
| 5,359,694 | 10/1994 | Concordel | 358/445 |
| 5,369,418 | 11/1994 | Richards | 345/185 |
| 5,406,306 | 4/1995 | Siann et al. | 345/115 |
| 5,440,344 | 8/1995 | Asamura et al. | 348/405 |
| 5,442,718 | 8/1995 | Kabayashi et al. | 382/166 |
| 5,517,588 | 5/1996 | Kondo | 348/445 |
| 5,550,936 | 8/1996 | Someya et al. | 348/625 |

*Primary Examiner*—Kee M. Tung
*Assistant Examiner*—Martin Loui
*Attorney, Agent, or Firm*—Donald C. Casey, Esq.

[57] ABSTRACT

The present invention is related to an apparatus for digital video format conversion for a decompressed digital video data outputted from a decompressor, which includes a video interpolation device processing the decompressed digital video data by way of on-the-fly interpolating and filtering procedures to obtain an interpolated and filtered digital video data, and a color space converter electrically connected to the video interpolation device for converting the interpolated and filtered digital video data processed by the on-the-fly interpolating and filtering procedures from a first color space into a second one to complete the digital video format conversion. The present apparatus processes the decompressed digital video data by way of on-the-fly interpolating and filtering procedures and therefore the resolution of an original frame can be shown on a computer monitor to obtain a good frame quality. In addition, the present invention executes the digital video format conversion on the line basis instead of frame basis so that the hardware circuit can therefore be simplified to be co-integrated in an IC together with the decompressor to reduce the cost.

19 Claims, 8 Drawing Sheets

DIGITAL VIDEO FORMAT CONVERSION BY UPSAMPLING DECOMPRESSED DATA USING ON-THE-FLY INTERPOLATION AND COLOR CONVERSION

This application is a continuation of application Ser. No. 08/330,464 filed Oct. 28, 1994 now abandoned.

FIELD OF THE INVENTION

The present invention is related to an apparatus for digital video format conversion, and more particularly to an apparatus for executing a digital video format conversion for a decompressed digital video data outputted from a decompressor;

BACKGROUND OF THE INVENTION

Owing to the rise of multiple media to be processed in a computer, digital video/audio compression becomes an important technique. In general, compressed full motion video and audio signals are stored in a compact disc. In order to comply with the transmission rate of and the capacity for storing data in the compact disc, the image resolution of compressed full motion video signals is expressed in a source input format (SIF). A frame is composed of 352×240 or 352×288 pixels, each of which further includes three color elements, Y, U and V. The Y-element relates to luminance or brightness and represents the brightness degree of a color, while the U- and V-elements relate to chrominance or color difference and represent the difference between one of three primitive components, i.e. R (red), G (green) and B (blue), of a color and the luminance of the color. The U-element represents B-Y (blue difference) and V-element represents R-Y (red difference). The compressed digital video data stored in the compact disc is usually obtained through compression operation by using digital video compression algorithm after the SIF resolution is obtained by vertically and horizontally subsampling an original frame with a higher resolution. Therefore, the compressed digital video data should be processed with a digital video format conversion after decompression operation in order to retrieve the high resolution of the original frame, i.e. the Y, U and V-elements of the decompressed digital video data should be vertically and horizontally upsampled.

FIG. 1 is a schematic block diagram showing a conventional digital video data decompressing and displaying subsystem, which includes a digital video decoder 11, a video post processor 12, a frame memory 13, a D/A converter 14, a multiplexer 15 and a computer monitor 16. The compressed digital video data is decompressed by the digital video decoder 11, then subject to digital video format conversion by the video post processor 12 and the frame memory 13, and finally converted to an analog signal through the D/A converter 14. The analog signal and the analog graphic signal A coming from the VGA (Video Graphic Array) are transmitted to and displayed on the computer monitor 16 through the multiplexer 15.

From FIG. 1, the digital video format conversion in the conventional system is executed by the video post processor 12 and the frame memory 13, and is effected on a frame-basis which includes processes of receiving an input frame, post-processing, e.g. zooming, scaling, filtering or color-space converting the input frame, writing the processed frame into a frame buffer, and then outputting the frame from the frame buffer. Because the digital video format conversion in the conventional system is on a flame-basis, the frame memory 13 needs to be a VRAM or DRAM having a memory capacity large enough for serving as the frame buffer. In addition, the video post processor 12 in the conventional image format converting device has to take care of processing a whole frame at one time on the frame-basis so that the required hardware circuit and memory capacity are complicated, relatively large and costly than those of the one on the line-basis.

There exists another conventional digital video format conversion system besides the above-mentioned one, which replaces a line buffer and a simple accessing circuit for the video post processor 12 and the frame memory 13. The decompressed digital video data under a specific scan line is stored in the line buffer, and then data under double scan lines are outputted from the line buffer, in which data under the double scan lines have the same pixel data as those under the specific scan line stored in the line buffer. This kind of system outputs identical data intentionally assigned under two scan lines not differently processed so that the presented effect shows the output time is twice magnified without the ability of achieving the original resolution, and thus results in a spatial aliasing visual effect to adversely influence a better video quality.

SUMMARY OF THE INVENTION

An object of the present invention is to provide an apparatus for digital video format conversion which can present a resolution of an original time.

Another object of the present invention is to provide an apparatus for digital video format conversion which is more economical.

In accordance with the present invention, an apparatus for executing a digital video format conversion for a decompressed digital video data outputted from a decompressor, includes a video interpolation device processing the decompressed digital video data by way of on-the-fly interpolating and filtering procedures to obtain an interpolated and filtered digital video data, and a color space converter electrically connected to the video interpolation device for converting the interpolated and filtered digital video data from a first color space into a second one to complete the digital video format conversion.

In accordance with another aspect of the present invention, the first color space includes three elements, luminance Y and chrominances U and V, and the second color space also includes three elements, R (red), G (green) and B (blue).

In accordance with another aspect of the present invention, the video interpolation device includes a vertical interpolation unit interpolating and filtering the decompressed digital video data in a vertical direction and then outputting a vertically interpolated digital video data, and a horizontal interpolation unit interpolating and filtering the vertically interpolated digital video data in a horizontal direction. The vertical interpolation unit further includes a Y-element vertical interpolator interpolating and filtering the Y-element of the decompressed digital video data in a vertical direction, a U-element vertical interpolator interpolating and filtering the U-element of the decompressed digital video data in the vertical direction, and a V-element vertical interpolator interpolating and filtering the V-element of the decompressed digital video data in the vertical direction, wherein each of the Y-, U- and V-element vertical interpolators includes a line memory interleavingly accessing the decompressed digital video data of an image under a scan line, a vertical filter electrically connected to the line memory for receiving and in turn interpolating and filtering the decompressed digital video data inputted into and outputted from the line memory and a multiplexer electrically connected to the line memory and the vertical filter for alternately transmitting data outputted from the line memory and the vertical filter to the horizontal interpolation unit. The multiplexer transmits the outputted data of the vertical filter to the horizontal interpolation unit when the line memory is receiving the image decompressed digital video data, but transmits the outputted data of the line memory to the horizontal interpolation unit when the line memory is not receiving any the image data.

In accordance with another aspect of the present invention, during access cycle of each address in the line memory, the line memory outputs a data stored originally in the each address first, and then stores into the each address a new data. A capacity of the line memory of the U- or V-element vertical interpolator is half that of the Y-element vertical interpolator, and an accessing frequency of the line memory of the U- or V-element vertical interpolator is also half that of the Y-element vertical interpolator. The vertical filter develops an interpolated scan line for the image by way of linearly interpolating the image decompressed digital video data under two adjacent scan lines.

Similar to the vertical interpolation unit, the horizontal interpolation unit further includes a Y-element horizontal interpolator interpolating and filtering a Y-element of the vertically interpolated digital video data in a horizontal direction, a U-element horizontal interpolator interpolating and filtering a U-element of the vertically interpolated digital video data in the horizontal direction, and a V-element horizontal interpolator interpolating and filtering a V-element of the vertically interpolated digital video data in the horizontal direction, wherein each of the Y-, U- and V-element horizontal interpolators includes a 1st-stage pixel latch latching a pixel data outputted from the vertical interpolation unit, a 2nd-stage pixel latch electrically connected to the 1st-stage pixel latch for shift-latching an output data of the 1st-stage pixel latch, a horizontal filter electrically connected to the 1st-stage and the 2nd-stage pixel latches for filtering the latched data of the 1st-stage and the 2nd-stage pixel latches, and a 3rd-stage pixel latch electrically connected to the horizontal filter for sampling and then outputting pixel data outputted by the horizontal filter. The horizontal filter develops an interpolated pixel by linearly interpolating two adjacent pixels. A pixel frequency used in each of the U- and V-element horizontal interpolators is half that of the Y-element horizontal interpolator, and a sampling frequency each of the 1st-stage and the 2nd-stage pixel latches is half that of the 3rd-stage pixel latch.

In accordance with another aspect of the present invention, the present apparatus is co-integrated in an IC together with the decompressor.

The present invention may be best understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
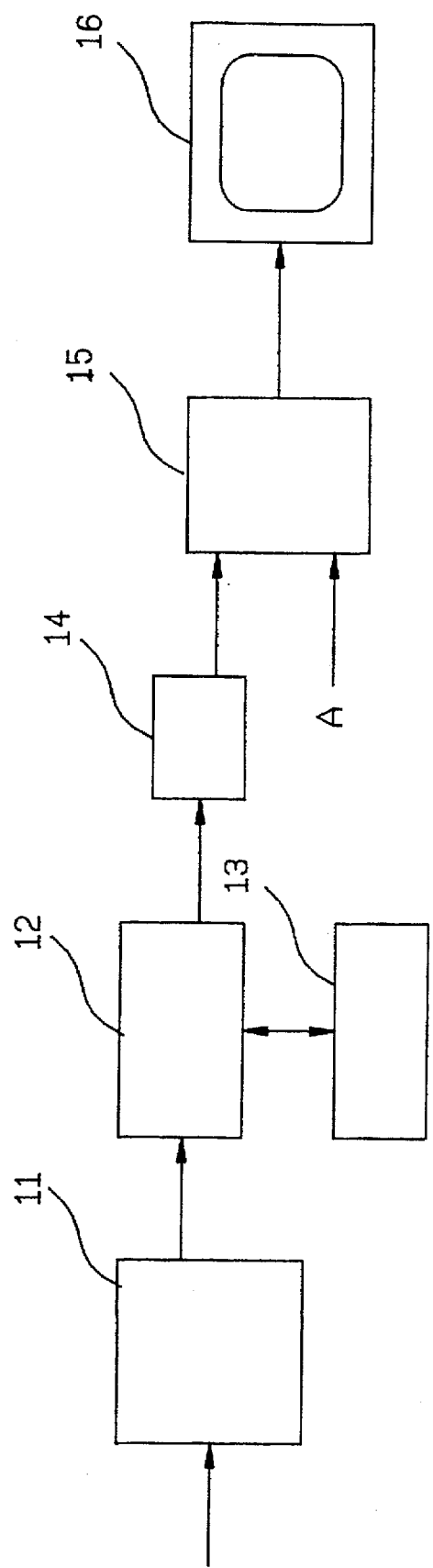
FIG. 1 is a schematic block diagram showing a conventional digital video data decompressing and displaying system.
Figure 2:
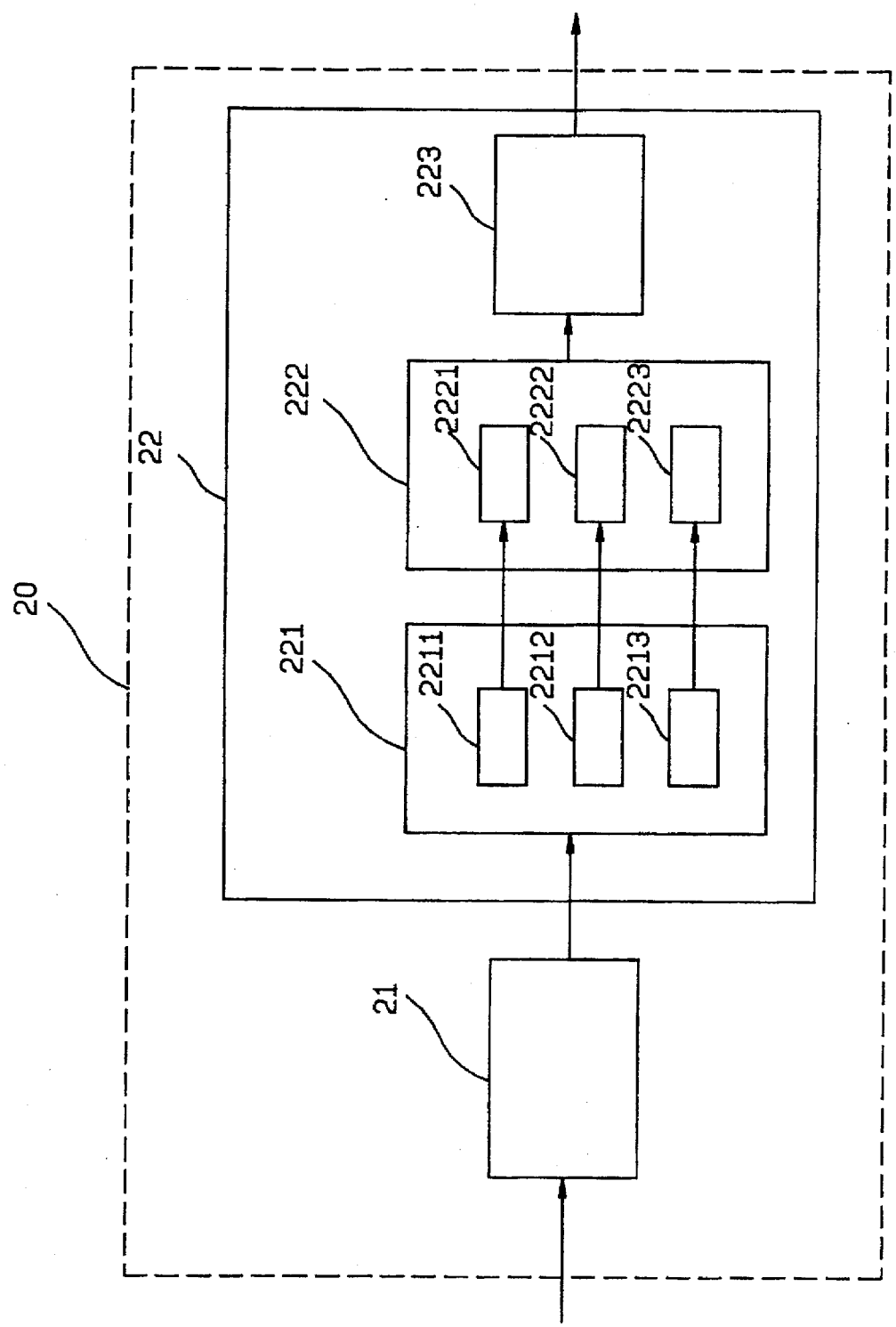
FIG. 2 is a schematic block diagram showing a preferred embodiment of an apparatus for digital video format conversion according to the present invention.

Please refer to FIG. 2 which is a schematic block diagram showing a preferred embodiment of an apparatus for digital video format conversion according to the present invention. The apparatus 22 for digital video format conversion includes a vertical interpolation unit 221 which further includes a Y-element vertical interpolator 2211, a U-element vertical interpolator 2212 and a V-element vertical interpolator 2213, a horizontal interpolation unit 222 which further includes a Y-element horizontal interpolator 2221, a U-element horizontal interpolator 2222 and a V-element horizontal interpolator 2223, and a color space converter 223. There also shows a decompressor 21 in FIG. 2.

The compressed digital video data is transmitted to the decompressor 21 for decompression, and then to the vertical interpolation unit 221 for respectively vertically interpolating and filtering Y-, U- and V-elements of the decompressed digital video data. The vertically interpolated and filtered digital video data is transmitted to the horizontal interpolation unit 222 to have its Y-, U- and V-elements respectively horizontally interpolated and filtered. Afterwards, the digital video data processed through the vertical and horizontal interpolations and filterings is transmitted to the color space converter 223 to convert the Y-, U- and V-elements into R-, G- and B-elements. By this way, the purpose of digital video format conversion is achieved.

The major difference between the present apparatus and the conventional ones lies in that the present apparatus complies with a progressive-scanning displaying way of a computer monitor and processes the decompressed digital video data by way of on-the-fly interpolating and filtering procedures so that the necessary hardware circuit thereof is simpler than that of the conventional one which uses the video post processor and the frame memory for processing on the flame-basis. Therefore, the present apparatus 22 can be co-integrated in an IC 20 together with the decompressor 21 to save the circuit cost and the package cost.

The operation of the vertical interpolation unit 221 and the horizontal interpolation unit 222 are now described detailedly below.

Figure 3:
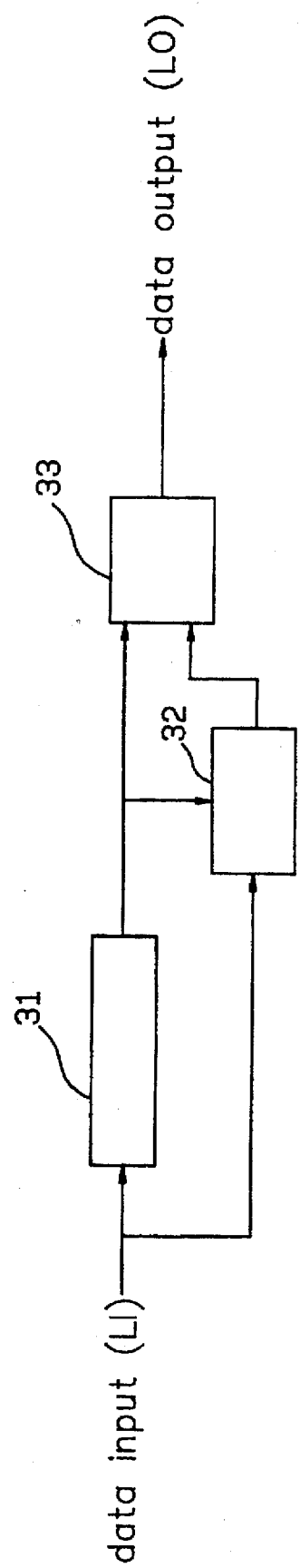
FIG. 3 is a schematic block diagram showing a preferred embodiment of any vertical interpolator of an apparatus for digital video format conversion according to the present invention.

Refer now to FIG. 3 which is a schematic block diagram showing a preferred embodiment of any vertical interpolator of an apparatus for digital video format conversion according to the present invention. Each of the Y-element vertical interpolator 2211, the U-element vertical interpolator 2212 and the V-element vertical interpolator 2213 includes a line memory 31, a vertical filter 32 and a multiplexer 33. The line memory 31 is used for storing digital video data under a scan line; the vertical filter 32 is used for interpolating and filtering data under two adjacent scan lines, and the multiplexer 33 is used for alternately transmitting data outputted from the line memory 31 and the vertical filter 32 to the horizontal interpolation unit 222.

Figure 4:
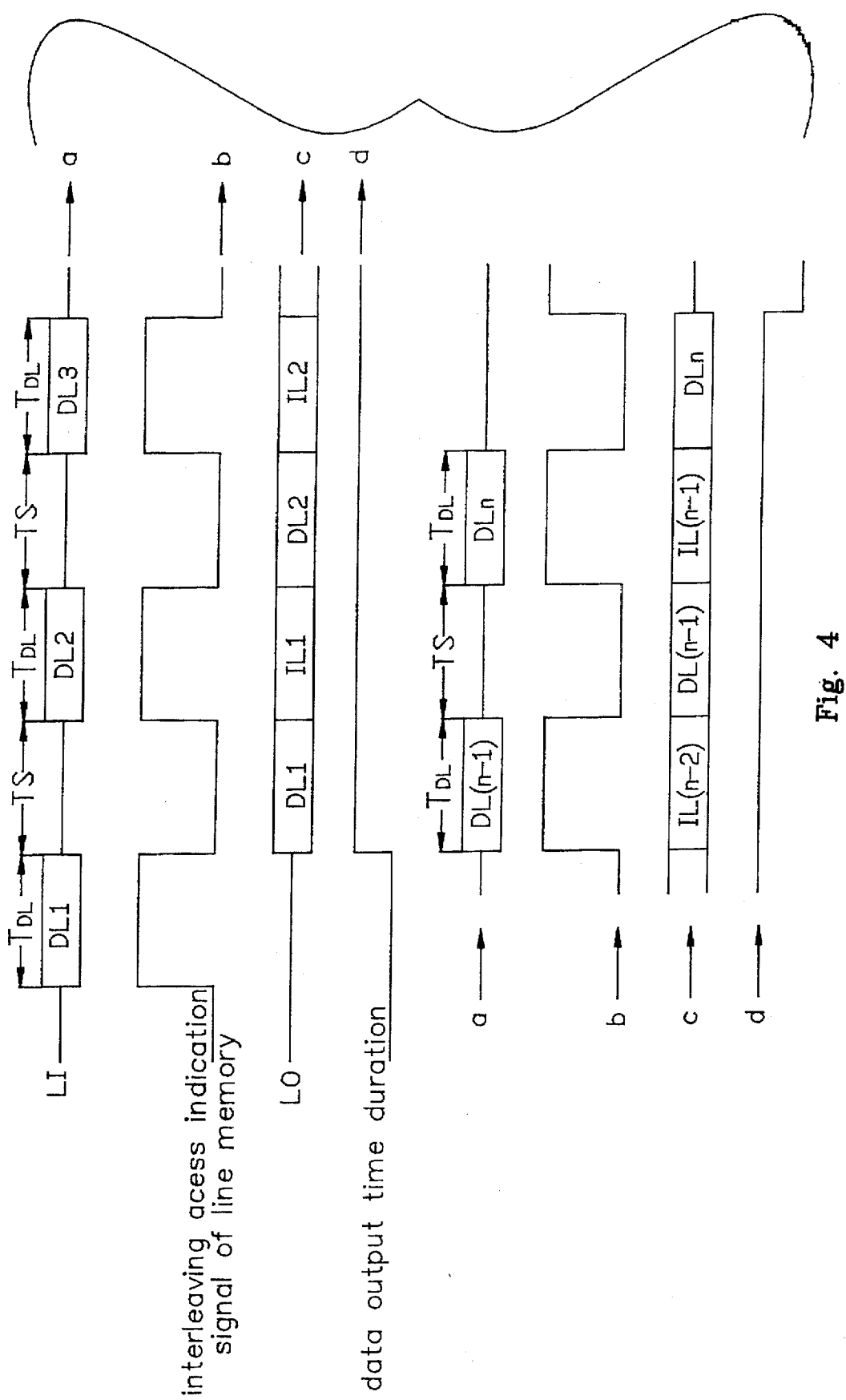
FIG. 4 is a schematic diagram showing a time sequence of a preferred embodiment of any vertical interpolator of an apparatus for digital video format conversion according to the present invention.

FIG. 4 is a schematic diagram showing a time sequence of one of the Y-, U-, and V-element vertical interpolators 2211, 2212 and 2213. During a time interval $T_{DL}$ when data under a scan line is transmitted from the decompressor 21 to the line memory 31, the line memory 31 interleavingly accessing the decompressed digital video data. That is, the line memory 31 outputs the data originally stored in a specific address, then receives in that address a new data within an access cycle. Each data under a scan line is not only transmitted to the line memory 31 but also to the vertical filter 32, as shown in FIG. 3, to have the present digital video data under the scan line and the data under the last scan line interleavingly outputted by the line memory 31 interpolated and filtered therein. During the time interval $T_{DL}$, the multiplexer 33 chooses the data under the scan line processed by the vertical filter 32 to be transmitted to the horizontal interpolation unit 222. On the other hand, during a time interval $T_S$ when no data of the scan line is transmitted from the decompressor 21 to the line memory 31, the multiplexer 33 chooses the data under the scan line originally stored in the line memory 31 to the horizontal interpolation unit 222.

Figure 5:
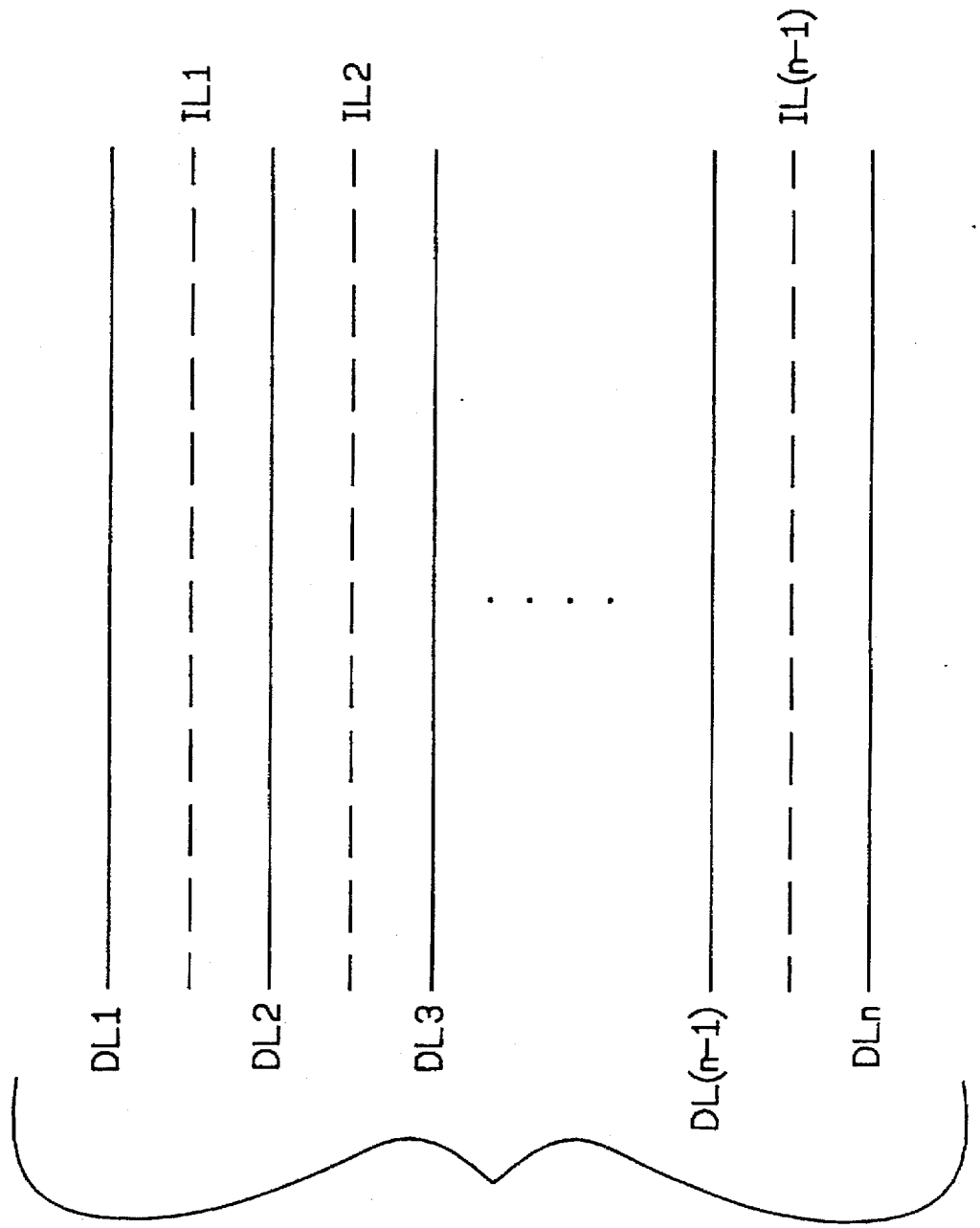
FIG. 5 is a schematic diagram showing outputted data lines of a preferred embodiment of any vertical interpolator of an apparatus for digital video format conversion according to the present invention.

FIG. 5 is a schematic diagram showing outputted signals of data under scan lines of one of the vertical interpolators 2211, 2212 and 2213, wherein any one of "DL1–DLn" represents a signal under a scan line directly outputted by the line memory 31, and "IL1–IL$_{(n-1)}$" represents a signal under a scan line interpolated and filtered through the vertical filter 32. The vertical filter 32 develops an interpolated scan line by way of linearly interpolating the corresponding pixel data of two adjacent scan lines. In every decompressed data under a scan line, the pixel number of the U- or V-element is half that of the Y-element, so the capacity of the line memory of the U- or V-element vertical interpolator, 2212 or 2213, is half that of the Y-element vertical interpolator 2211, and an accessing frequency of the line memory of the U- or V-element vertical interpolator, 2212 or 2213, is also half that of the Y-element vertical interpolator 2211.

Figure 6:
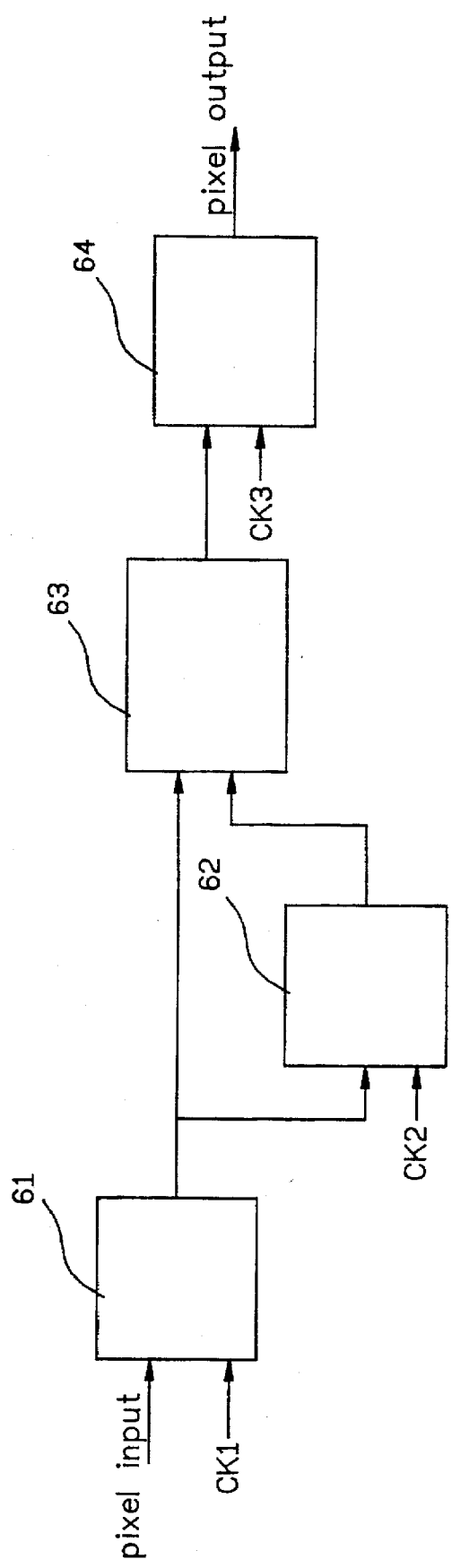
FIG. 6 is a schematic block diagram showing a preferred embodiment of any horizontal interpolator of an apparatus for digital video format conversion according to the present invention.

Referring now to FIG. 6 which is a schematic block diagram showing a preferred embodiment of any horizontal interpolator of an apparatus for digital video format conversion according to the present invention, each of the Y-element horizontal interpolator 2221, the U-element horizontal interpolator 2222 and the V-element horizontal interpolator 2223 includes a 1st-stage pixel latch 61, a 2nd-stage pixel latch 62, a horizontal filter 63 and a 3rd-stage pixel latch 64. The 1st-stage and the 2nd stage pixel latches, 61 and 62, shiftingly latch the pixel data transmitted from the vertical interpolation unit 221 in order that the horizontal filter 63 can filter the pixel data latched by the two pixel latches 61 and 62, and then the 3rd-stage pixel latch 64 samples and then outputs the pixel data outputted by the horizontal filter 63. The frequency of the sampling signal CK3 used in the 3rd-stage pixel latch 64 for sampling the pixel data outputted by the horizontal filter 63 is defined as the pixel rate.

Figure 7:
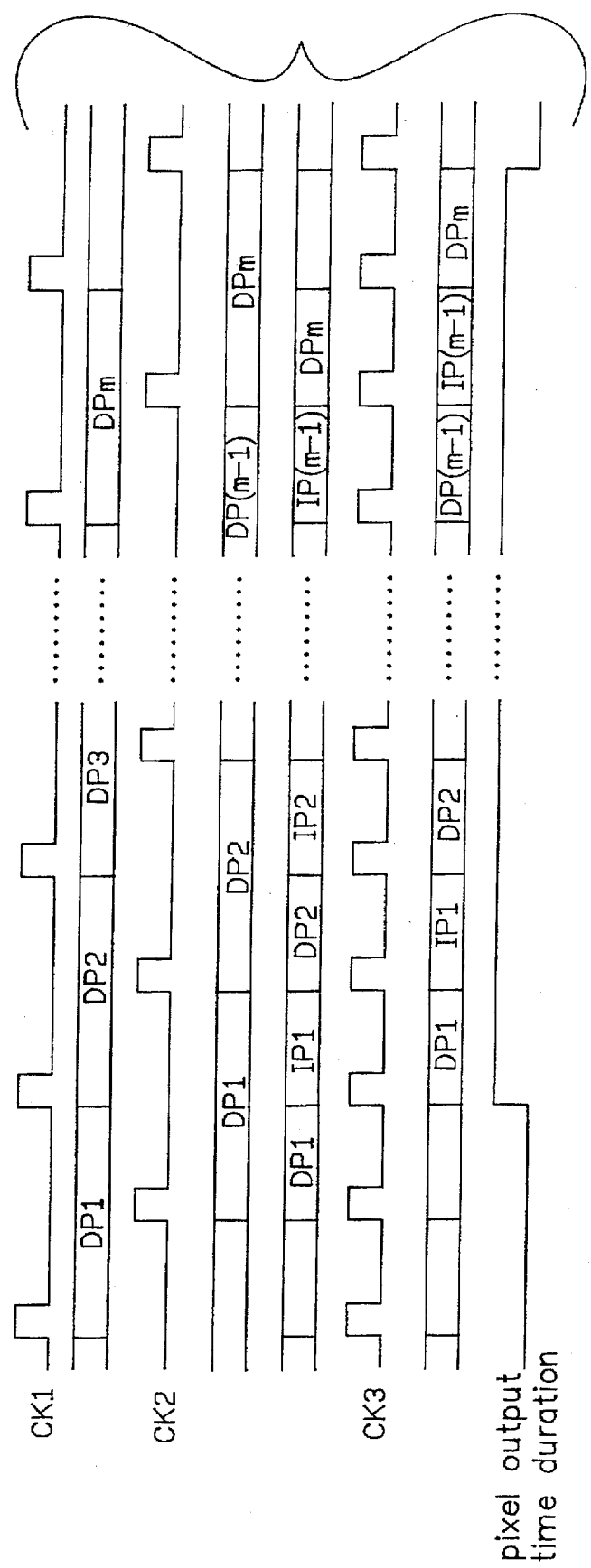
FIG. 7 is a schematic diagram showing a time sequence of preferred a embodiment of any horizontal interpolator of an apparatus for digital video format conversion according to the present invention.
Figure 8:
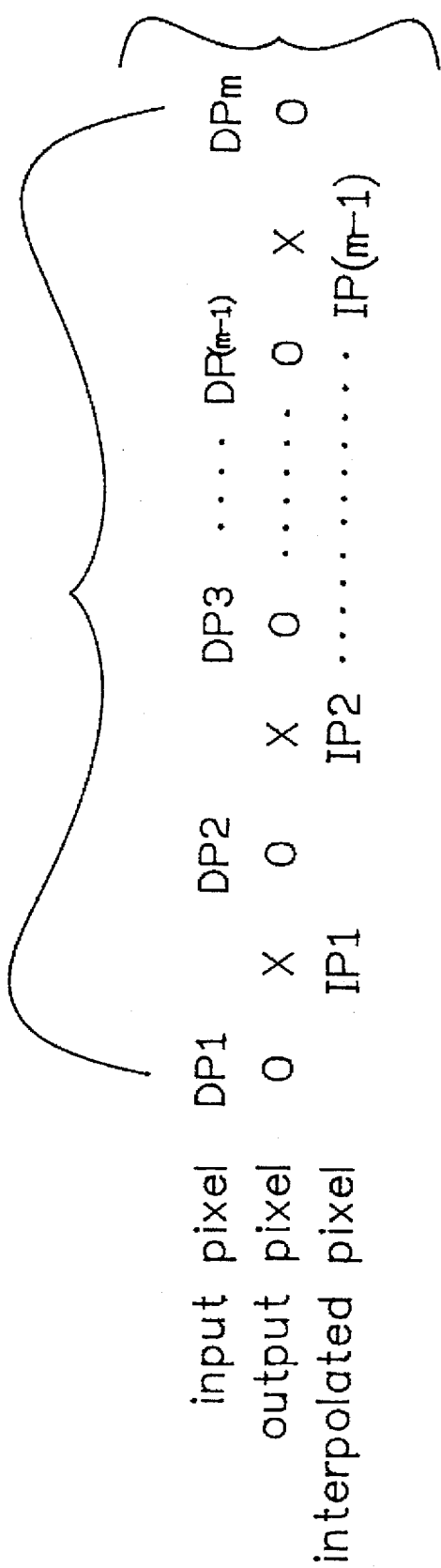
FIG. 8 is a schematic diagram showing outputted pixels of a preferred embodiment of any horizontal interpolator of an apparatus for digital video format conversion according to the present invention.

FIG. 7 is a schematic diagram showing a time sequence of one of the Y-, U-, and V-element horizontal interpolators 2221, 2222 and 2223. The frequency of the sampling signal CK1 used in the 1st-stage pixel latch 61 is half of the pixel rate, the frequency of the sampling signal CK2 used in the 2nd-stage pixel latch 62 is the same as that of the 1st-stage pixel latch 61 except that the phase of CK2 lags that of CK1 by one pixel cycle, i.e. the two latches 61 and 62 serially proceed the shifting latch of the pixel data. The data latched by the two latches 61 and 62 are then filtered through the horizontal filter 63 which linearly interpolates the pixel data outputted by the two latches 61 and 62, and thus the inputted pixel data (DP1, DP2 ... DPm) and the interpolated pixel data (IP1, IP2 ... IPm-1) are alternately outputted after filtered, as show in FIG. 8.

Because the horizontal resolution of U- or V-element of the decompressed frame is half that of the Y-element, a pixel frequency used in each of the U- and V-element horizontal interpolators, 2222 and 2223, is half that of the Y-element horizontal interpolator 2221, and a sampling frequency of each of the 1st-stage and the 2nd-stage pixel latches is half that of the 3rd-stage pixel latch.

To sum up, the present apparatus processes the decompressed digital video data by way of on-the-fly interpolating and filtering procedures and therefore the resolution of an original frame can be presented on a computer monitor to obtain a good frame quality. In addition, the present invention executes the digital video format conversion on the line basis instead of the frame basis so that the hardware circuit can be simplified to be co-integrated in an IC together with the decompressor to reduce the cost.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An apparatus for executing a digital video format conversion for upsampling a decompressed digital video data outputted from a decompressor, comprising:

a video interpolation device processing said decompressed digital video data by way of on-the-fly interpolating and filtering procedures in series and line by line to obtain an interpolated and filtered digital video data, wherein said on-the-fly interpolating and filtering procedures are executed in the moment while said decompressed digital video data is outputted from said decompressor; and a color space converter electrically connected to said video interpolation device for converting said interpolated and filtered digital video data from a first color space into a second one to complete said digital video format conversion.

2. An apparatus according to claim 1, wherein said first color space includes three elements.

3. An apparatus according to claim 2, wherein said three elements are luminance Y and chrominances U and V.

4. An apparatus according to claim 1, wherein said second color space includes three elements.

5. An apparatus according to claim 4, wherein said three elements are R (red), G (green) and B (blue).

6. An apparatus according to claim 1, wherein said video interpolation device includes:

a vertical interpolation unit interpolating and filtering said decompressed digital video data in a vertical direction and then outputting a vertically interpolated digital video data; and a horizontal interpolation unit interpolating and filtering said vertically interpolated digital video data in a horizontal direction.

7. An apparatus according to claim 6, wherein said vertical interpolation unit includes:

a Y-element vertical interpolator interpolating and filtering said Y-element of said decompressed digital video data in a vertical direction;

a U-element vertical interpolator interpolating and filtering said U-element of said decompressed digital video data in said vertical direction; and a V-element vertical interpolator interpolating and filtering said V-element of said decompressed digital video data in said vertical direction.

8. An apparatus according to claim 7, wherein each of said Y-, U- and V- element vertical interpolators comprises:

a line memory interleavingly accessing said decompressed digital video data of an image under a scan line in a first period of time and storing a scan line data corresponding to said image under said scan line in a second period of time;

a vertical filter electrically connected to said line memory for receiving and in turn interpolating between and filtering said decompressed digital video data inputted into and outputted from said line memory while said decompressed digital video data of said image are interleavingly accessed by said line memory; and a multiplexer electrically connected to said line memory and said vertical filter for alternately transmitting said scan line data outputted from said line memory in said second period of time and an interpolated data from said vertical filer in said first period of time to said horizontal interpolation unit.

9. An apparatus according to claim 8, wherein said multiplexer transmits said interpolated data of said vertical filter to said horizontal interpolation unit when said line memory is receiving said image decompressed digital video data, but transmits said scan line data of said line memory to said horizontal interpolation unit when said line memory is not receiving any said image data.

10. An apparatus according to claim 8, wherein during access cycle of each address in said line memory, said line memory outputs a data stored originally in said each address first, and then stores into said each address a new data.

11. An apparatus according to claim 8, wherein a capacity of said line memory of each of said U- and V-element vertical interpolators is half that of said Y-element vertical interpolator.

12. An apparatus according to claim 8, wherein an accessing frequency of said line memory of each of said U- and V-element vertical interpolators is half that of said Y-element vertical interpolator.

13. An apparatus according to claim 8, wherein said vertical filter develops an interpolated scan line for said image by way of linearly interpolating said image decompressed digital video data under two adjacent scan lines, wherein data of said two adjacent scan lines are interleavingly accessed in said line memory.

14. An apparatus according to claim 6, wherein said horizontal interpolation unit includes:

a Y-element horizontal interpolator interpolating and filtering a Y-element of said vertically interpolated digital video data in a horizontal direction;

a U-element horizontal interpolator interpolating and filtering a U-element of said vertically interpolated digital video data in said horizontal direction; and a V-element horizontal interpolator interpolating and filtering a V-element of said vertically interpolated digital video data in said horizontal direction.

15. An apparatus according to claim 14, wherein each of said Y-, U- and V-element horizontal interpolators comprises:

a 1st-stage pixel latch latching a pixel data outputted from said vertical interpolation unit;

a 2nd-stage pixel latch electrically connected to said 1st-stage pixel latch for shifting-latching an output data of said 1st-stage pixel latch;

a horizontal filter electrically connected to said 1st-stage and said 2nd-stage pixel latches for filtering said latched data of said 1st-stage and said 2nd-stage pixel latches; and a 3rd-stage pixel latch electrically connected to said horizontal filter for sampling and then outputting pixel data outputted by said horizontal filter.

16. An apparatus according to claim 15, wherein said horizontal filter develops an interpolated pixel by linearly interpolating two adjacent pixels.

17. An apparatus according to claim 15, wherein a pixel frequency used in each of said U- and V-element horizontal interpolators is half that of said Y-element horizontal interpolator.

18. An apparatus according to claim 15, wherein a sampling frequency of each of said 1st-stage and said 2nd-stage pixel latches is half that of said 3rd-stage pixel latch.

19. An apparatus according to claim 1, being co-integrated in an IC together with said decompressor.

* * * * *